United States Patent
Stafford

(10) Patent No.: US 10,967,792 B1
(45) Date of Patent: Apr. 6, 2021

(54) APPARATUS FOR MONITORING PERIPHERY OF A VEHICLE AND DISPLAYING A VIEW OF THE PERIPHERY ON A DISPLAY DEVICE

(71) Applicant: Roger Stafford, Redlands, CA (US)

(72) Inventor: Roger Stafford, Redlands, CA (US)

( * ) Notice: Subject to any disclaimer, the term of this patent is extended or adjusted under 35 U.S.C. 154(b) by 0 days.

(21) Appl. No.: 16/158,679

(22) Filed: Oct. 12, 2018

(51) Int. Cl.
| | |
|---|---|
| *B60R 1/00* | (2006.01) |
| *H04N 21/47* | (2011.01) |
| *H04N 21/431* | (2011.01) |
| *H04N 5/265* | (2006.01) |
| *H04N 5/247* | (2006.01) |

(52) U.S. Cl.
CPC ............... *B60R 1/00* (2013.01); *H04N 5/247* (2013.01); *H04N 5/265* (2013.01); *H04N 21/4316* (2013.01); *H04N 21/47* (2013.01); *B60R 2300/304* (2013.01); *B60R 2300/802* (2013.01); *B60R 2300/8066* (2013.01)

(58) Field of Classification Search
CPC .... H04N 5/247; H04N 5/265; H04N 5/44591; H04N 21/4316; H04N 21/47; B60R 1/00; B60R 2300/304; B60R 2300/802; B60R 2300/8066
USPC ................................. 348/148, 159; 340/435
See application file for complete search history.

(56) References Cited

U.S. PATENT DOCUMENTS

| | | | |
|---|---|---|---|
| 8,018,490 B2 | 9/2011 | Yuasa et al. | |
| 8,058,980 B2 | 11/2011 | Yanagi et al. | |
| 2006/0078328 A1* | 4/2006 | Franke | B60R 1/00 396/429 |
| 2009/0079553 A1* | 3/2009 | Yanagi | B60R 1/00 340/435 |
| 2010/0220189 A1* | 9/2010 | Yanagi | B60R 1/00 348/148 |
| 2014/0002660 A1* | 1/2014 | Takahashi | B60R 1/00 348/148 |
| 2016/0065796 A1* | 3/2016 | Happy | B60R 1/002 348/376 |
| 2017/0313288 A1* | 11/2017 | Tippy | B60R 11/04 |
| 2018/0154831 A1* | 6/2018 | Spencer | H04N 7/181 |
| 2018/0232195 A1* | 8/2018 | Jaegal | G06F 3/14 |

* cited by examiner

*Primary Examiner* — Alexander Gee
(74) *Attorney, Agent, or Firm* — Sanchelima & Associates, P.A.; Christian Sanchelima; Jesus Sachelima

(57) ABSTRACT

An apparatus for monitoring periphery of a vehicle and displaying a view on a display device is disclosed. The apparatus comprises imaging units coupled at side and rear end of the vehicle. The imaging units provided at side are coupled to a fender of the vehicle. The apparatus comprises an image-processing unit to process images captured by the imaging units. The display device is provided at an interior of the vehicle. For example, the display device is provided at a dashboard or at a rooftop of the vehicle. The display device comprises a plurality of display areas, each configured to display the images captured by the imaging units provided at the side and rear end of the vehicle.

14 Claims, 8 Drawing Sheets

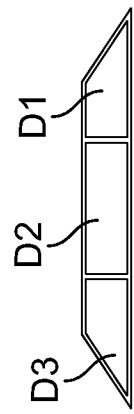
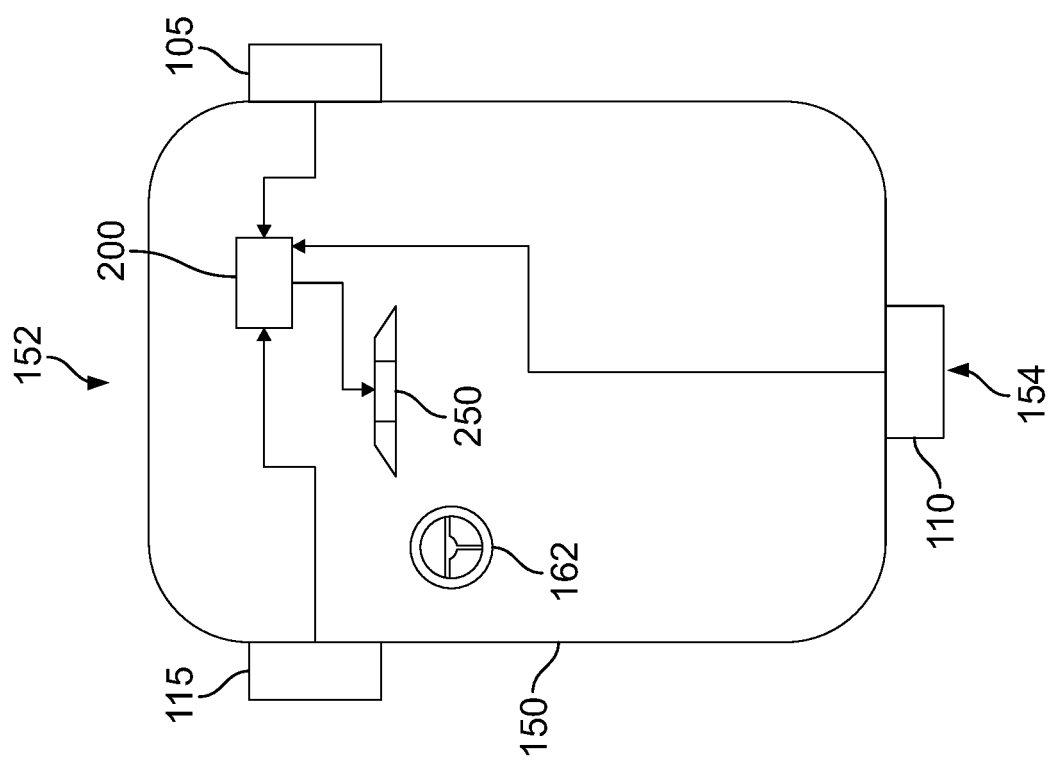

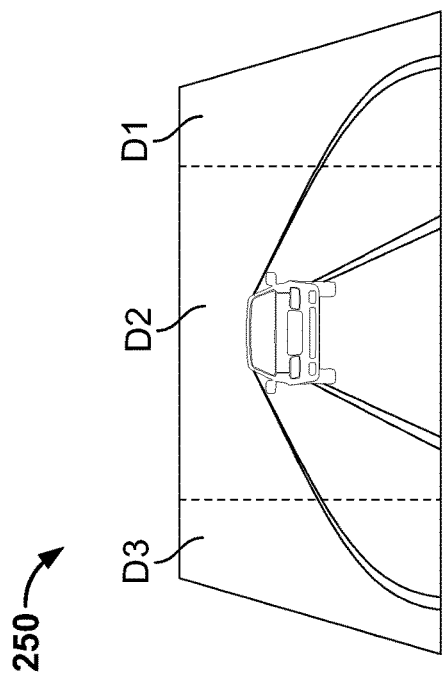
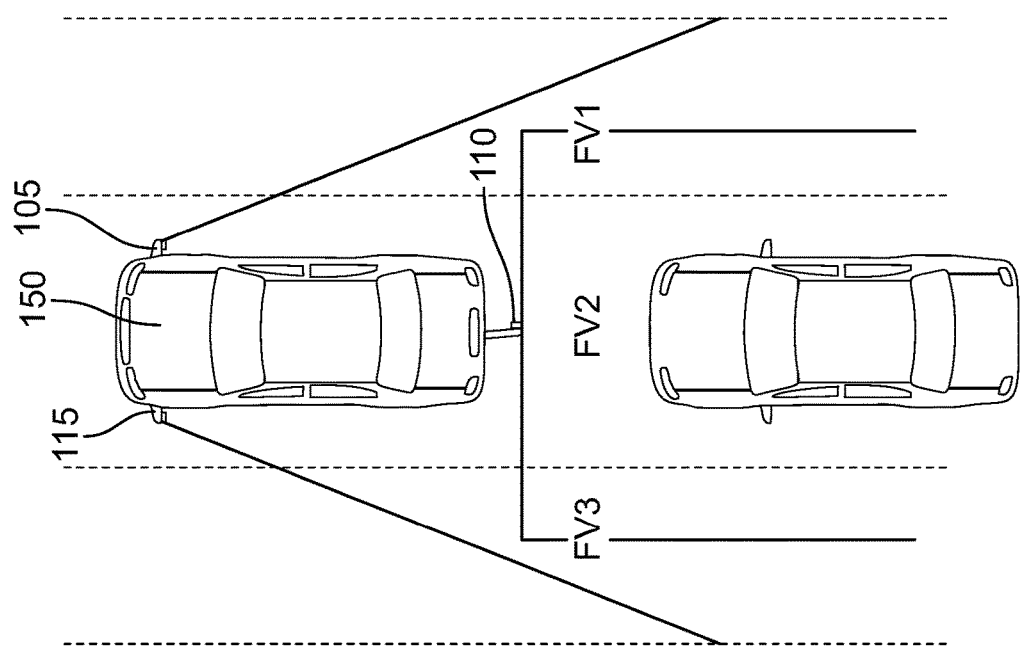
FIG. 5
FIG. 4

APPARATUS FOR MONITORING PERIPHERY OF A VEHICLE AND DISPLAYING A VIEW OF THE PERIPHERY ON A DISPLAY DEVICE

BACKGROUND OF THE INVENTION

1. Field of the Invention

The present disclosure generally relates to monitoring surroundings of a vehicle. More specifically, the present disclosure relates to an apparatus for monitoring periphery of a vehicle and displaying a view of the periphery on a display device.

2. Description of the Related Art

It is known that vehicles such as cars, buses, trucks have mirrors provided to assist a driver to view surrounding of the vehicle. The mirrors may include side view mirrors provided at both sides of the vehicle. Further, the mirrors may include a rearview mirror provided at an interior of the vehicle that facilitates in viewing rear passenger compartment or rear view of the vehicle. Generally, the mirrors help the driver to view periphery or surroundings of the vehicle indicating traffic in a path the vehicle is travelling. Based on the traffic, the driver may drive the vehicle in straight path or take turns at desired speed.

It is important to adjust an angle at which each of the mirrors is positioned to obtain clear view of the periphery of the vehicle. Without clear view, the driver may come close to other vehicles or may get hit by other vehicle coming behind his vehicle.

In order overcome above difficulties, several methods to monitor surroundings of the vehicle and displaying the surroundings have been proposed in the past. For example, image-capturing units are provided at the side view mirrors and rearward of the vehicle. The image-capturing units capture the surrounding of the vehicle and images are displayed on a display device provided in the vehicle. The driver of the vehicle may view the display device to assess the surrounding of the vehicle instead of looking in the side view mirrors and the rear view mirror.

An example of a method for monitor surroundings of a vehicle and displaying the surroundings is disclosed in a U.S. Pat. No. 8,018,490. In U.S. Pat. No. 8,018,490, a vehicle surrounding image display device which combines an image obtained by reducing in size an image taken by a camera provided at the center of the rear side of a vehicle, and images obtained by deforming images taken by cameras provided at the left and right sides of the vehicle such that the outward inclination of the inner side in the vehicle width direction of each of the left and right side images is gradually increased toward the lower end of the inner side is disclosed. The vehicle surrounding image display device then generates a single image simulating the circumstances behind the user's own vehicle as observed from a single virtual viewpoint in a realistic form, and displays the generated image on a display device.

Another example of a method for monitor surroundings of a vehicle and displaying the surroundings is disclosed in a U.S. Pat. No. 8,058,980. In U.S. Pat. No. 8,058,980, a vehicle periphery monitoring apparatus including an image-capturing device, a display device, a blind spot determining section, and a processing section is disclosed. The image-capturing device is arranged to capture an image of a region rearward of a host vehicle and an image of a region laterally rearward of the host vehicle. The processing section is configured to switch a displayed image on the display device from a first display image to a second display image upon determination of a following vehicle created blind spot region by the blind spot determining section. The first display image includes the image of the region rearward of the host vehicle, and the second display image includes at least a portion of the image of the region laterally rearward of the host vehicle that encompasses the following vehicle created blind spot region which is absent from the first display image.

Although the above methods help in monitoring surroundings of a vehicle and displaying the surroundings, they have several problems. For instance, the image-capturing devices are placed at the side view mirrors and at rear side of the vehicle. As a result, the driver may get the view from the side view mirror only and not the entire length of the vehicle. It should be noted that above disclosures are not suited for vehicles such as trucks or trolley, which are relatively long. Further, the driver may not obtain the complete view of the side portion of the. In other words, the driver will not be able to view the portion from front end of the vehicle until the side view mirrors. As a result, the front portion of the vehicle will create a blind spot for the driver. Without clear view over the length of the vehicle, the driver might come close to other travelling on either sides of the vehicle.

Other documents describing the closest subject matter provide for a number of more or less complicated features that fail to solve the problem in an efficient and economical way. None of these patents suggest the novel features of the present invention. Specifically, none of the disclosures in the art disclose an apparatus comprising imaging units provided at rear side, and sides i.e., near fender of a vehicle for monitoring periphery of the vehicle. The images captured by the imaging units are displayed on a display device provided in the vehicle.

Therefore, there is a need in the art for an apparatus for monitoring periphery of a vehicle and displaying a view of the periphery on a display device.

SUMMARY OF THE INVENTION

It is one of the main objects of the present invention to provide an apparatus for monitoring periphery of a vehicle and displaying a view on a display device and avoids the drawbacks of the prior art.

It is one object of the present invention to provide imaging units at side of a vehicle, preferably at fender of the vehicle to obtain complete side periphery view of the vehicle.

It is one object of the present invention to provide imaging units at front and rear end of a vehicle. The imaging units provided at the front end and the rear end are used in conjunction to obtain complete periphery view of the vehicle.

It is another object of the present invention to provide a display device at a dashboard or at a rooftop of the vehicle to display the images captured by the imaging units provided at front end, sides and rear end of the vehicle.

It is another object of the present invention to provide an apparatus for monitoring periphery of a vehicle and displaying a view on a display device is disclosed. The apparatus comprises imaging units coupled at side and rear end of the vehicle. The imaging units provided at side are coupled to a fender of the vehicle. The apparatus comprises an image-processing unit to process images captured by the imaging units. The display device is provided at an interior of the vehicle. For example, the display device is provided at a dashboard or at a rooftop of the vehicle. The display device comprises a plurality of display areas, each configured to display the images captured by the imaging units provided at the side and rear end of the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 illustrates a schematic diagram of the apparatus 100 provided in the vehicle 150, in accordance with one embodiment of the present disclosure.

FIG. 3 illustrates a display device 250 comprising a display area divided into a first display area D1, a second display area D2, and a third display area D3, in accordance with one embodiment of the present disclosure.

FIG. 4 illustrates a schematic diagram of capturing field of view by a first imaging unit 105, a second imaging unit 110, and a third imaging unit 115, in accordance with one embodiment of the present disclosure.

FIG. 5 illustrates a schematic diagram of the display device 250 displaying the field of views captured by the first imaging unit 105, the second imaging unit 110, and the third imaging unit 115, in accordance with one embodiment of the present disclosure.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an apparatus for monitoring periphery of a vehicle and displaying a view on a display device. The apparatus comprises imaging units coupled at side and rear end of the vehicle. The imaging units provided at side are coupled to a fender of the vehicle. The apparatus comprises an image-processing unit to process images captured by the imaging units. The display device is provided at an interior of the vehicle. For example, the display device is provided at a dashboard or at a rooftop of the vehicle. The display device comprises a plurality of display areas, each configured to display the images captured by the imaging units provided at the side and rear end of the vehicle.

Various features and embodiments of an apparatus for monitoring periphery of a vehicle and displaying a view on a display device are explained in conjunction with the description of FIGS. 1-11.

Figure 1:
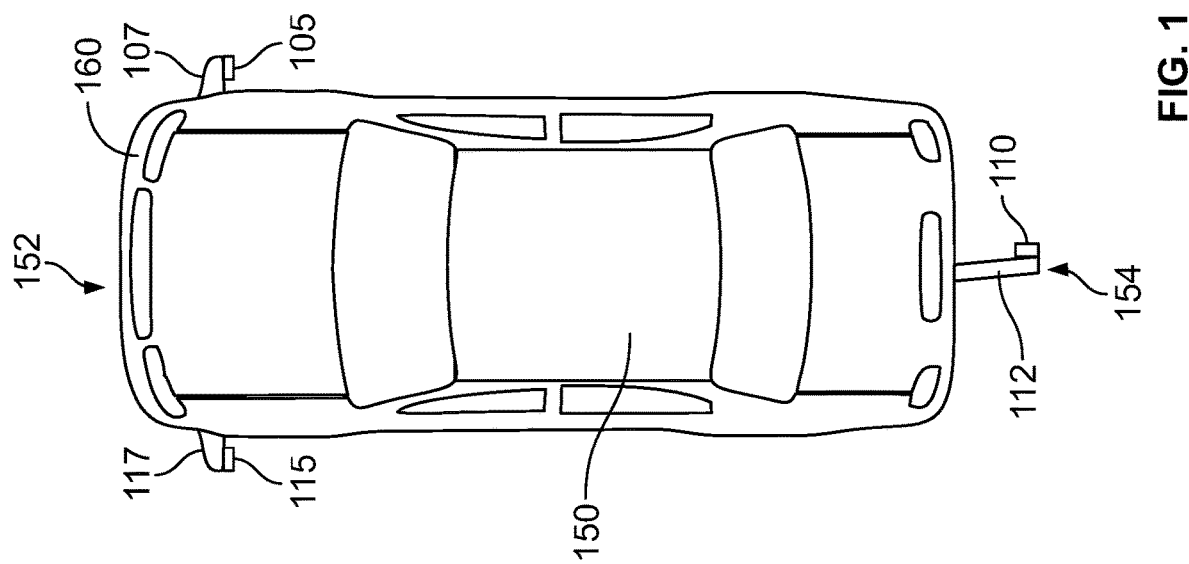
FIG. 1 illustrates a top view of the vehicle 150, in accordance with one embodiment of the present disclosure.

Referring to FIGS. 1 to 6, an apparatus 100 for monitoring periphery of a vehicle 150 and displaying is disclosed, in accordance with one embodiment of the present disclosure. The apparatus 100 is coupled to the vehicle 150. Referring to FIG. 1, a top view of the vehicle 150 is shown. The vehicle 150 may comprise a front end 152 and a rear end 154. The vehicle 150 may comprise a fender 160 provided at the front end 152. The vehicle 150 may comprise a steering wheel 162 (shown in FIG. 2). Further, the vehicle 150 may comprise a dashboard 165, a display 166, and a rooftop 170 (shown in FIGS. 9A and 9B).

Referring to FIG. 1, the apparatus 100 comprises a first imaging unit 105, a second imaging unit 110, and a third imaging unit 115. Each of the first imaging unit 105, the second imaging unit 110, and the third imaging unit 115 is capable of capturing still images or video of their respective field of view. The first imaging unit 105 is provided at right side of the vehicle 150. The second imaging unit 110 may be provided at the rear end 154 of the vehicle 150. Further, the third imaging unit 115 may be provided at left side of the vehicle 150. The first imaging unit 105 may be coupled to the vehicle 150 using a first connector 107. Specifically, the first connector 107 is provided at the fender 160 at right side of the vehicle 150. The second imaging unit 110 may be coupled to the vehicle 150 using a second connector 112. The third imaging unit 115 may be coupled to the vehicle 150 using a third connector 117. The third connector 117 is provided at the fender 160 at left side of the vehicle 150.

FIG. 2 shows a schematic diagram of the apparatus 100 provided in the vehicle 150. As specified above, the first imaging unit 105 is provided at right side of the vehicle 150. The second imaging unit 110 may be provided at the rear end 154 of the vehicle 150. Further, the third imaging unit 115 may be provided at left side of the vehicle 150. Each of the first imaging unit 105, the second imaging unit 110 and third imaging unit 115 is communicatively coupled an image processing unit 200. Further, the image-processing unit 200 is communicatively coupled to a display device 250 provided at interior of the vehicle 150.

Referring to FIG. 3, the display device 250 comprises a display area divided into a first display area D1, a second display area D2, and a third display area D3.

Referring to FIGS. 4 and 5, displaying of images captured by the first imaging unit 105, the second imaging unit 110, and the third imaging unit 115 at the display device 250 is explained, in accordance with one embodiment of the present disclosure. FIG. 4 shows a schematic diagram illustrating field of views captured by each of first imaging unit 105, the second imaging unit 110, and the third imaging unit 115. Specifically, the first imaging unit 105 captures a first field of view FV1, the second imaging unit 110 captures a second field of view FV2, and a third imaging unit 115 captures a third field of view FV3.

Each of the first field of view FV1, the second field of view FV2, and the third field of view FV3 captured by the first imaging unit 105, the second imaging unit 110, and the third imaging unit 115 is displayed at the first display area D1, the second display area D2, and the third display area D3 of the display area 250, respectively as shown in FIG. 5.

Figure 6:
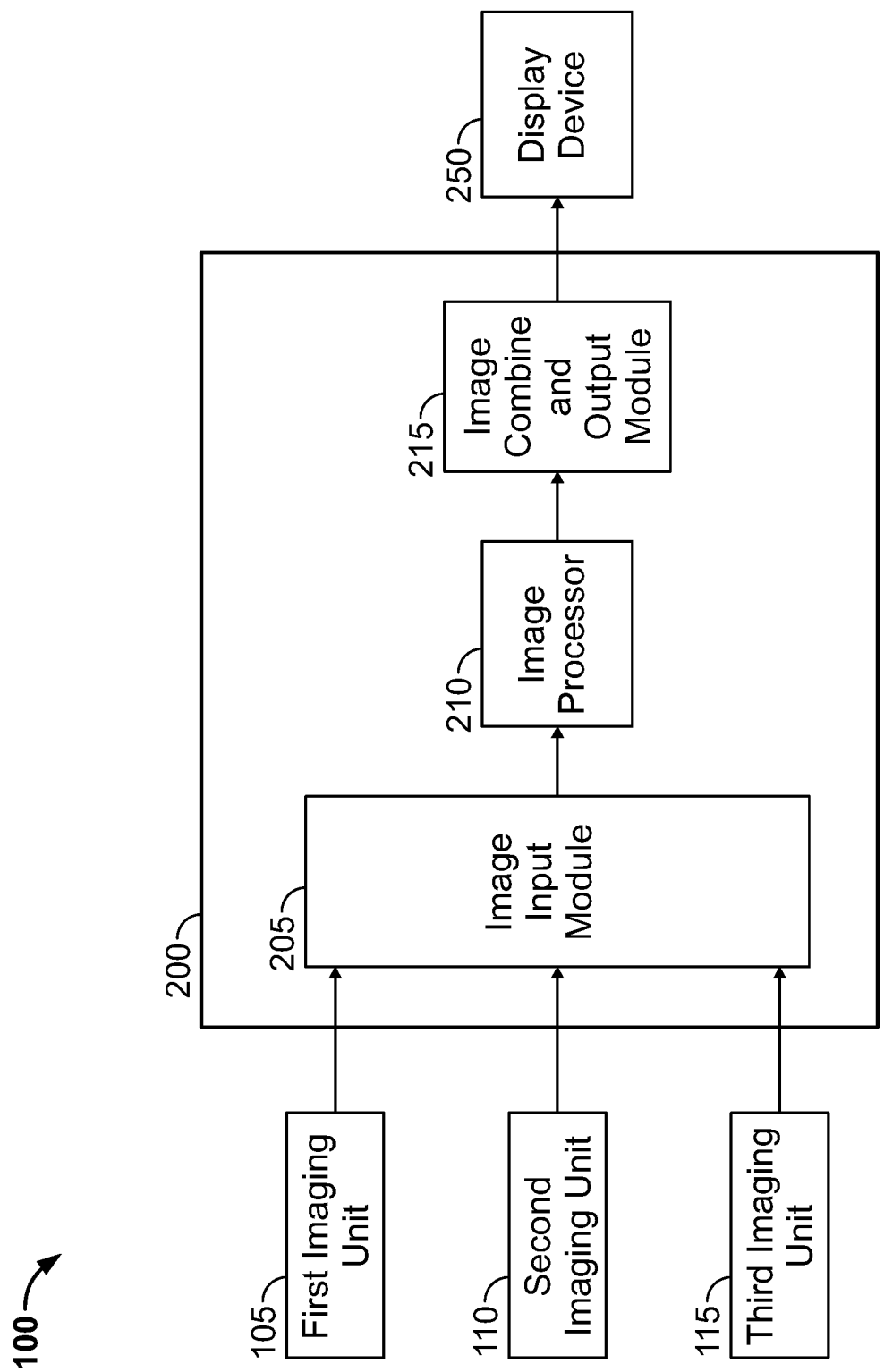
FIG. 6 illustrates a block diagram of the apparatus 100 for monitoring periphery and displaying the view of the periphery at the display device 250, in accordance with one embodiment of the present disclosure.

Referring to FIG. 6, a block diagram of the apparatus 100 for monitoring periphery and displaying the view of the periphery at the display device 250 is shown, in accordance with one embodiment of the present disclosure. At first, each of the first imaging unit 105, the second imaging unit 110, and the third imaging unit 115 captures respective field of views i.e., FV1, FV2 and FV3. Subsequently, the first imaging unit 105, the second imaging unit 110, and the third imaging unit 115 transmit the field of views i.e., FV1, FV2 and FV3 to the image-processing unit 200.

In one example, the image-processing unit 200 may comprise an image input module 205, an image processor 210 and an image combine and output module 215. In one example, the image-processing unit 200 may comprise a memory (not shown) coupled to the image processor 210.

When the first imaging unit 105, the second imaging unit 110, and the third imaging unit 115 transmit the field of views i.e., FV1, FV2 and FV3 to the image-processing unit 200, the image input module 205 receives the field of views. It should be understood that the image input module 205 receives the images captured by the first imaging unit 105, the second imaging unit 110, and the third imaging unit 115 separately. Further, the image input module 205 digitizes the images captured by the first imaging unit 105, the second imaging unit 110, and the third imaging unit 115. In one example, the image input module 205 digitizes the images based on a frame size pre-determined.

After digitizing the images separately, the image input module 205 transmits the digitized images to the image processor 210. Subsequently, the image processor 210 extracts pixel data from the image received from each of the first imaging unit 105, the second imaging unit 110, and the third imaging unit 115. It must be understood that the image processor 210 extracts pixel data from each of the first imaging unit 105, the second imaging unit 110, and the third imaging unit 115 separately. For example, the image processor 210 extracts pixel data corresponding to the image received from the first imaging unit 105 and generates an image in proportion to the first display area D1 in the display device 250. Similarly, the image processor 210 extracts pixel data corresponding to the image received from the second imaging unit 110 and generates an image in proportion to the second display area D2 in the display device 250. Similarly, the image processor 210 extracts pixel data corresponding to the image received from the third imaging unit 115 and generates an image in proportion to the third display area D3 in the display device 250.

After processing each of the images received from the first imaging unit 105, the second imaging unit 110, and the third imaging unit 115, the image processor 210 transmits the images to the image combine and output module 215. After receiving the images, the image combines and output module 215 combines the images and checks overlapping of pixels in the images received from the first imaging unit 105, the second imaging unit 110, and the third imaging unit 115. If there is any overlapping in the pixels from any two imaging units e.g., the first imaging unit 105 and the second imaging unit 110 or the second imaging unit 110 or the third imaging unit 115, then the image combines and output module 215 combines the pixels and forms a single pixel. The image combines and output module 215 combines the same pixels to avoid framing distorted or overlapping image. After combining similar pixels, the image combines and output module 215 sends the images captured by the first imaging unit 105, the second imaging unit 110, and the third imaging unit 115 to the display device 250. Specifically, the image combines and output module 215 transmits the image captured by the first imaging unit 105 to the first display area D1. Similarly, the image combines and output module 215 transmits the image captured by the second imaging unit 110 to the second display area D2. Furthermore, the image combines and output module 215 transmits the image captured by the third imaging unit 115 to the third display area D3.

Figure 7:
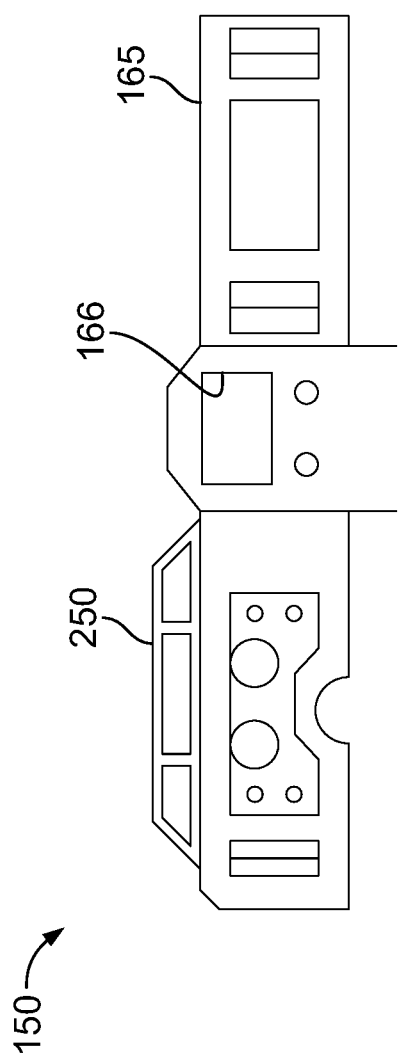
FIGS. 7 and 7A illustrate the display device 150 provided at an interior of the vehicle 150, in accordance with one embodiment of the present disclosure.
Figure 7A:
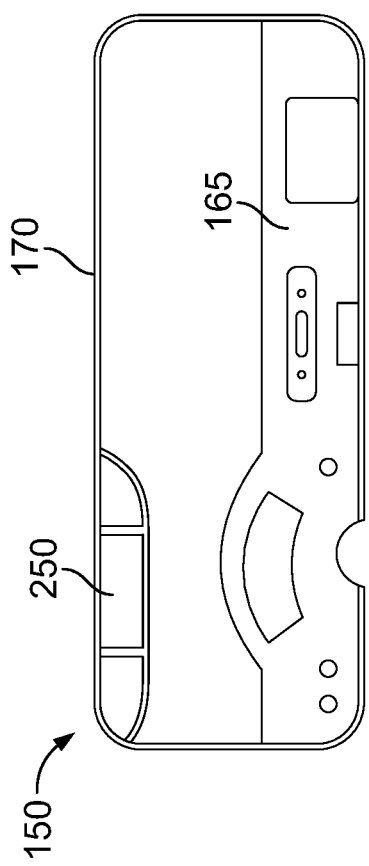

Referring to FIGS. 7 and 7A, the display device 250 provided at an interior (not shown) of the vehicle 150 is shown. In one example, the display device 250 may be provided at the dashboard 165 of the vehicle 150, as shown in FIG. 7. In another example, the display device 250 may be provided at the rooftop 170 of the vehicle 150, as shown in FIG. 7A.

Figure 8:
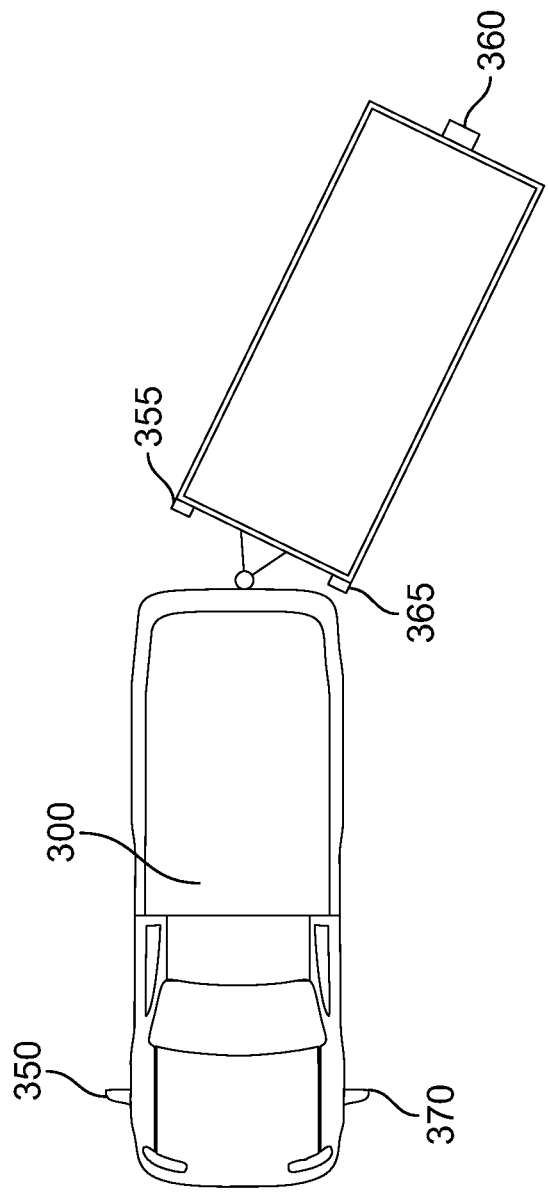
FIG. 8 illustrates a top view of the vehicle 300 coupled with plurality of imaging units to capture surroundings, in accordance with one embodiment of the present disclosure.

Referring to FIG. 8, the apparatus coupled to a vehicle 300 such as a truck or semi-truck comprising a trolley is shown, in accordance with one embodiment of the present disclosure. The vehicle 300 may be provided with a first imaging unit 350, a second imaging unit 355, a third imaging unit 360, a fourth imaging unit 365, and a fifth imaging unit 370. In the current embodiment, the first imaging unit 350 may be placed at fender (not shown) at right side of the vehicle 300. The second imaging unit 355 may be placed at right side of a trolley of the vehicle 300. The third imaging unit 360 may be placed at rear end of the vehicle 300. The fourth imaging unit 365 may be placed at left side of a trolley of the vehicle 300. The fifth imaging unit 370 may be placed at fender (not shown) at left side of the vehicle 300. Each of the first imaging unit 350, a second imaging unit 355, a third imaging unit 360, a fourth imaging unit 365, and a fifth imaging unit 370 captures images of respective field of views (similar to field of views FV1, Fv2, and FV3 explained above)

Figure 9:
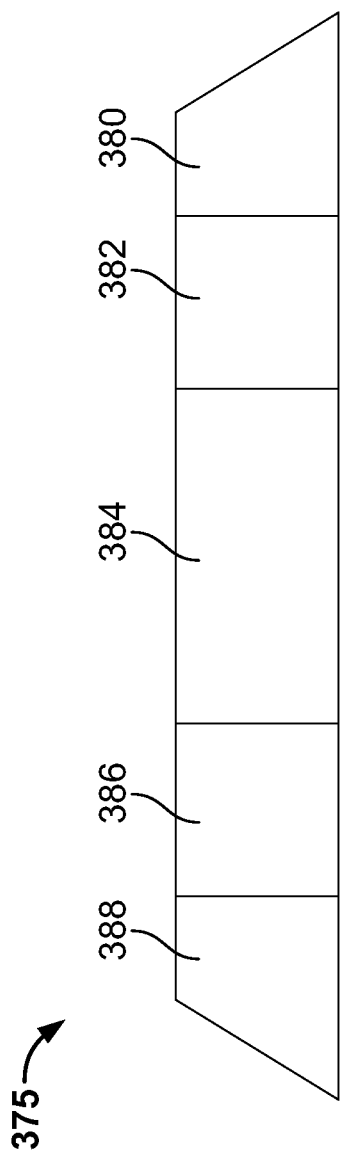
FIG. 9 illustrates a schematic diagram of the display device 375 displaying the field of views captured by the plurality of imaging units provided in the vehicle 300, in accordance with one embodiment of the present disclosure.

The vehicle 300 may comprise a display device 375 (similar to display device 250) provided at interior i.e., passenger compartment of the vehicle 300. The display device 375 comprises a first display area 380, a second display area 382, a third display area 384, a fourth display area 386, and a fifth display area 388, as shown in FIG. 9. It should be understood that the field of views captured by the first imaging unit 350, the second imaging unit 355, the third imaging unit 360, the fourth imaging unit 365, and the fifth imaging unit 370 are displayed at the first display area 380, the second display area 382, the third display area 384, the fourth display area 386, and the fifth display area 388, respectively. As such, it should be understood that the display device 375 might be configured to show the field of views of corresponding imaging units provided in the vehicle 300.

Figure 10:
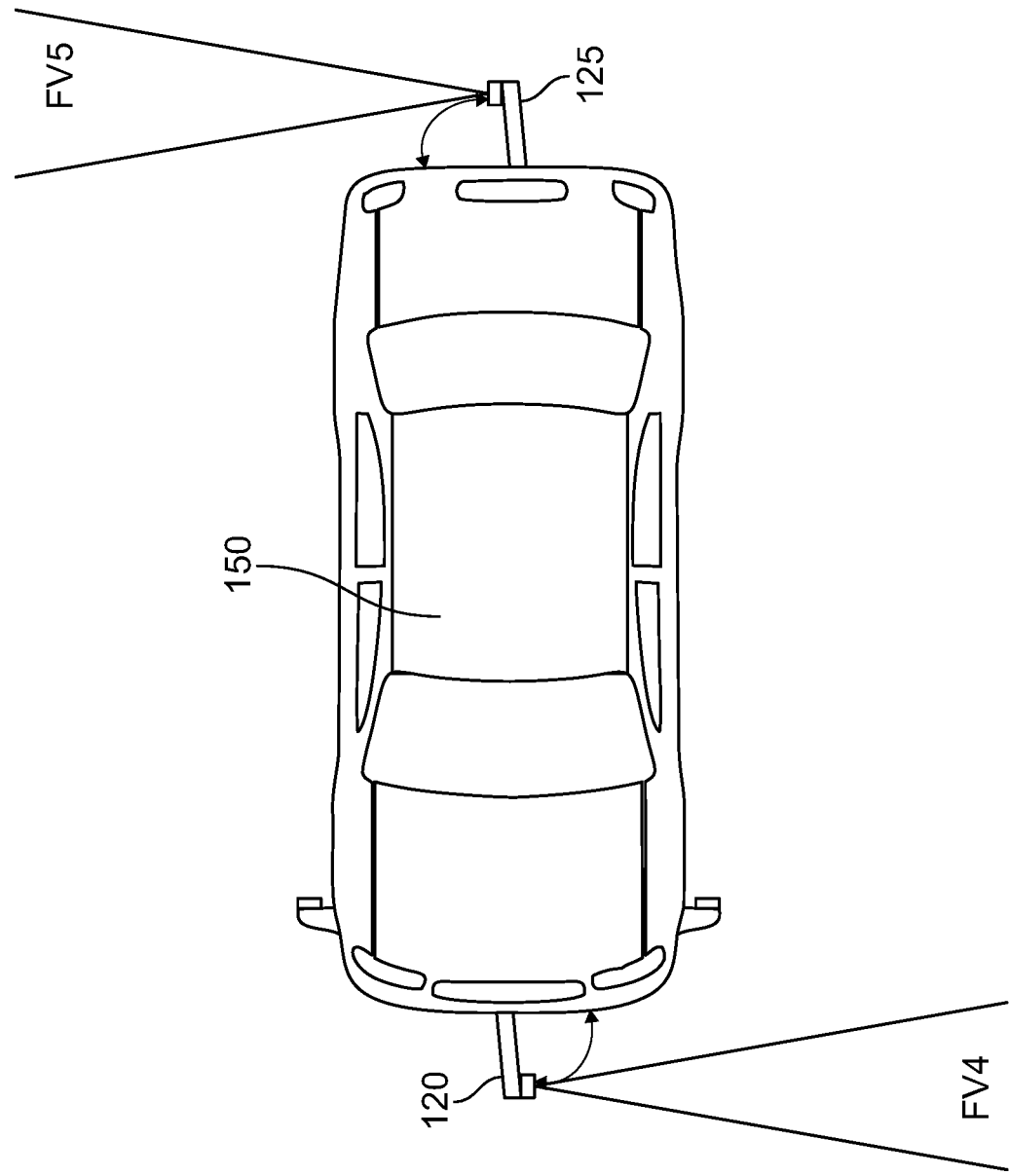
FIG. 10 illustrates a schematic diagram of the vehicle 150 comprising a fourth imaging unit 120 at front end and a fifth imaging unit 125 at rear end of the vehicle 150, in accordance with another embodiment of the present disclosure.

For the vehicle 300 such as the truck or semi-truck comprising the trolley as shown in FIG. 10, if the trolley is removed, then the third imaging unit 360 is coupled at the rear end of the vehicle 300 (similar to FIGS. 4 and 5). In other words, the vehicle 300 is provided with the first imaging unit 350 at the right side, the third imaging unit 360 is placed at rear end of the vehicle 300, and the fifth imaging unit 370 is placed at left side of the vehicle 300. As such, the images or field of views captured by each of the first imaging unit 350, the third imaging unit 360, and the fifth imaging unit 370 are displayed at the first display area 380, the third display area 384 and the fifth display area 388, respectively.

Further, if the trolley is coupled to the vehicle 300, then two imaging units i.e., the second imaging unit 355 and the fourth imaging unit 365 are coupled at the sides of the trolley and the field of views are displayed at the second display area 382 and the fourth display area 386, correspondingly as explained above with the help of FIG. 9.

In one implementation, the vehicle 150 may be provided with a fourth imaging unit 120 at the front end and a fifth imaging unit 125 at the rear end of the vehicle 150, as shown in FIG. 10. The one example, the fourth imaging unit 120 is intermittently showing the traffic perpendicular to the car. As can be seen from FIG. 10, the fourth imaging unit 120 is pointed to only one side of the vehicle 150, the side where the traffic is coming from. The fourth imaging unit 120 is hingedly coupled at the front end of the vehicle 150. When opened, the fourth imaging unit 120 comes out and then points to capture the traffic perpendicular to one side of the vehicle. When the vehicle's speed exceeds 10 mph the fourth imaging unit 120 closes. The fourth imaging unit 120 is mounted at the direct front of the vehicle 150 by the front license plate and extends about 6 inches in the open position. If the vehicle is stopped and in drive the fourth imaging unit 120 is opened. If the vehicle is stopped and is in neutral or parked, the fourth imaging unit 120 is retracted and closed.

Further, the vehicle 150 comprises a fifth imaging unit 125 provided at rear end of the vehicle 150. The fifth imaging unit 125 is intermittently showing the traffic perpendicular to the car. The fifth imaging unit 125 camera points to only one side of the vehicle, the side where the traffic is coming from. It should be understood that fifth imaging unit 125 is only activated when in reverse. The fifth imaging unit 125 is hingedly mounted and can be retracted such that the fifth imaging unit 125 is concealed. When the fifth imaging unit 125 is opened (in reverse) it is hingedly opened and comes out a small difference and then points to capture the traffic perpendicular to one side of the vehicle. Once the car is put in Drive, the fifth imaging unit 125 is retracted. As can be seen, the fourth imaging unit 120 points to the opposite perpendicular side (FV4) to that of the fifth imaging unit 125 (FV5), e.g. the fourth points to the left and the fifth points to the right.

The first imaging unit 105 and the third imaging unit 115 are hingedly opened and retracted on the opposite sides of the front fender of the vehicle 150 and work and see the same as side view mirrors, expect without blind spots. The first imaging unit 105 and the third imaging unit 115 are constantly activated. The first imaging unit 105 and the third imaging unit 115 replace the left and right side view mirror. In other words, the first imaging unit 105 and the third imaging unit 115 do not retract, they are always open.

The second imaging unit 110, can be mounted on top of the vehicle 150, e.g., on the rear bumper or any similar location that allows the second imaging unit 110 to view to the rear of the vehicle 150. The second imaging unit 110 is also constantly activated. The second imaging unit 110 replaces the rear view mirror of the vehicle. As explained above, the fourth imaging unit 120 and the fifth imaging unit 125 are selectively activated and retracted after use.

As the first imaging unit 105, the second imaging unit 110, and the third imaging unit 115 are constantly activated, live feed/dynamic visual from each of the first imaging unit 105, the second imaging unit 110, and the third imaging unit 115 is shown on the display device 250. In one example, when the fourth imaging unit 120 and the fifth imaging unit 125 are activated, the feed may be displayed around the radio area where the feed of current back up cameras are shown.

Further, if there is a trailer (as shown in FIG. 8) being towed, then additional cameras are added to the trailer. The display that would show the feed from the rear second camera would no longer be shown in the middle rear view screen. That feed will be relaxed with the feed from the sixth, seventh, and eighth cameras on the trailer. The sixth camera will work similar to the second camera except on the trailer to see the traffic behind it. The seventh, and eighth cameras work similar to the first and third cameras. The seventh and eighth cameras remain open at all times.

Figure 11:
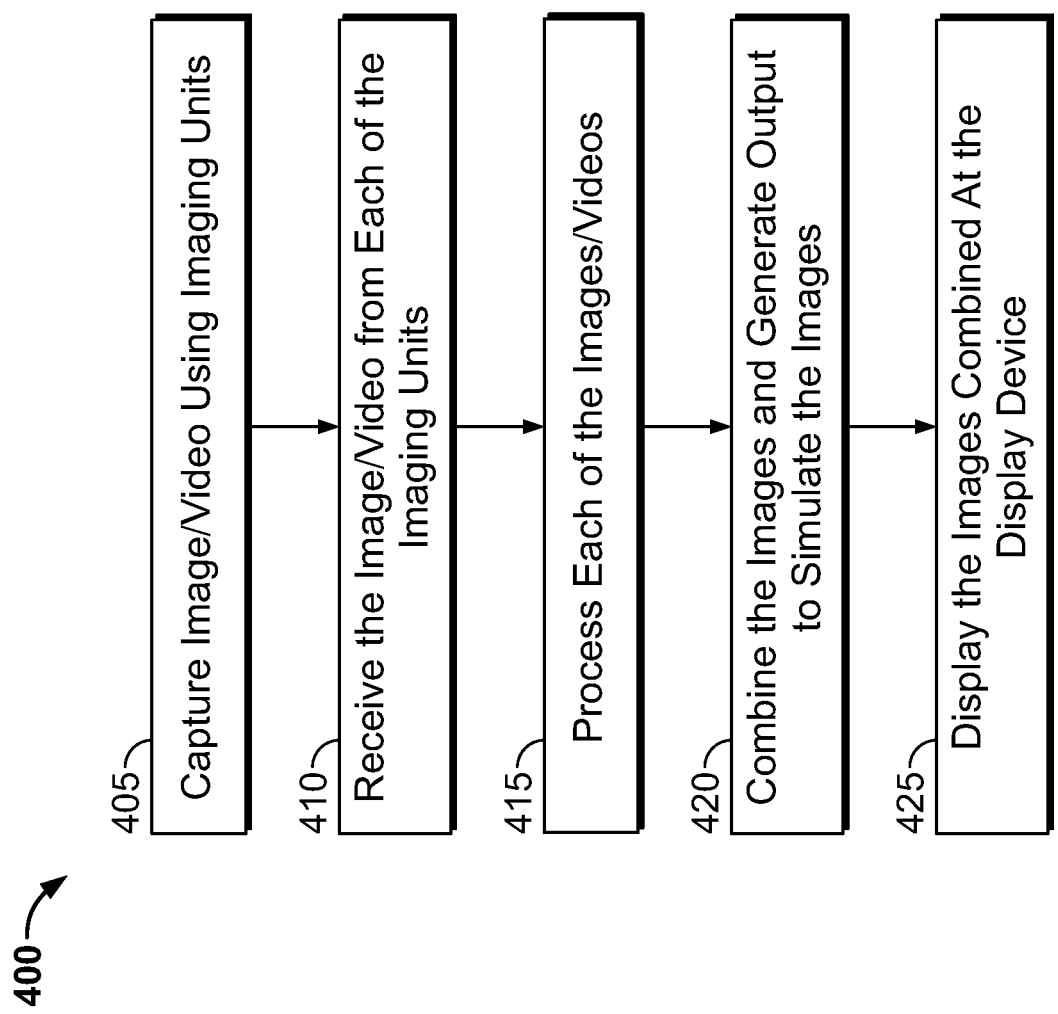
FIG. 11 illustrates a method 200 for monitoring periphery and displaying the view of the periphery at the display device, in accordance with one embodiment of the present disclosure.

Referring to FIG. 11, a method 400 for monitoring periphery of a vehicle and displaying on a display device is shown, in accordance with an embodiment of the present disclosure. The method 400 may be described in a sequence of steps to be performed for monitoring periphery of a vehicle and displaying on a display device. However, the order in which the method 400 is described and is not intended to be construed as a limitation, and any number of the described method blocks can be combined in any order to implement the method 400 or alternate methods. Additionally, individual blocks may be deleted from the method 400 without departing from scope of the disclosure described herein. For ease of explanation, in the embodiments described below, the method 400 may be implemented in the above-described apparatus 100.

At step 405, each of the imaging units placed at sides and rear end of the vehicle is used to capture images of their corresponding field of views.

At step 410, the images captured by the imaging units are received at the image-processing unit 200.

At step 415, the image-processing unit 200 processes the images. In one example, the image-processing unit 200 processes images captured by each of the imaging units separately. Further, the image-processing unit 200 transmits the images to the image combine and output module 215.

At step 420, the image combines and output module 215 combines pixels that are overlapping in the images and sends the images to the display device 250.

At step 425, the display device 250 displays each of the field of views captured by the imaging units at the first display area D1, the second display area D2, and the third display area D3 of the display area 250.

It is evident from the above disclosure that the apparatus facilitates in capturing images i.e., different field of views and display the images at the display device. As such, the driver of the vehicle is able to view surroundings by looking at the display device. Specifically, the imaging units placed at side captures side view of the vehicle. Further, the imaging unit placed at the rear end captures rear view of the vehicle. The imaging units i.e., placed at side and rear of the vehicle provide complete view of the surrounding of the vehicle at the display device. Correspondingly, the driver will get clear view of the surrounding without having any blind spots of the vehicle.

In one example, the imaging units may be closed i.e., the connectors are bends such that the imaging units are kept close to the vehicle. When the driver starts the engine of the vehicle, the connectors may be configured to flip open and position the imaging units to capture field of views as explained above.

Further, the display device may be divided into multiple sections to show field of views captured by the imaging units provided at different places in the vehicle.

Furthermore, the driver may get complete view of the vehicle when the vehicle is reversed. The imaging units may be configured to operate either manually or automatically i.e., when the driver starts the engine.

It should be understood that the display device may be provided as a separate device or the display device is provided on a sun visor provided in the vehicle.

The apparatus may be provided as an integral part of the vehicle or may be provided as an accessory, which may be removably fitted to the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for monitoring periphery of a vehicle, the apparatus comprising:

imaging units coupled at sides, a rear end and a front end of a vehicle, said imaging units further defined as a first imaging unit, a second imaging unit, a third imaging unit, a fourth imaging unit and a fifth imaging unit, said first imaging unit and said third imaging unit being at said sides, said second imaging unit and said fifth imaging unit being located at said rear end, said fourth imaging unit being located at said front end, wherein the imaging units at the sides are coupled to a fender of the vehicle, said fourth imaging unit and said fifth imaging unit being hingedly mounted to said vehicle, said fourth imaging unit and said fifth imaging unit are pointed to one side of said vehicle and are adapted to intermittently show traffic perpendicular to the vehicle, said fifth imaging unit being opened when said vehicle is in reverse, said first imaging unit, said second imaging unit, said third imaging unit are constantly activated, said fourth imaging unit being centrally located on said front end and extending away from said front end when said fourth imaging unit is opened, said fifth imaging unit being centrally located on said rear end and extending away from said rear end when said fifth imaging unit is opened, said fourth imaging unit being opened when said vehicle is stopped and in drive;

an image-processing unit to process images captured by the imaging units; and a display device provided at an interior of the vehicle, said display device being atop of a dashboard of said vehicle, said display device being entirely in constant abutting constant with said dashboard, wherein the display device includes a plurality of display areas, each configured to display the images captured by the imaging units, wherein the number of said plurality of display areas corresponds with the number of said imaging units, said plurality of display areas being parallel to each other and on a same horizontal plane, said plurality of display areas corresponding to said first imaging unit, said second imaging unit, and said third imaging unit are constantly activated.

2. The apparatus of claim 1, wherein the image-processing unit comprises an image input module to receive the images from the imaging units.

3. The apparatus of claim 2, wherein the image-processing unit comprises an image processor to process the images received by the image input module.

4. The apparatus of claim 3, wherein the image-processing unit comprises an image combine and output module to combine the images processed by the image processor.

5. The apparatus of claim 1, further comprises an imaging unit provided at a front end of the vehicle to capture front field of view of the vehicle.

6. The apparatus of claim 1, wherein the display device is provided at a rooftop of the vehicle, said display device being entirely above of said dashboard, said display device being entirely in abutting contact with said rooftop.

7. The apparatus of claim 1, wherein said fourth imaging unit is retracted and closed when said vehicle is stopped and in neutral or parked.

8. The apparatus of claim 1, wherein said fourth imaging unit is retracted and closed when said vehicle exceeds a speed of 10 mph.

9. The apparatus of claim 1, wherein said fourth imaging unit and said fifth imaging unit face opposite directions.

10. The apparatus of claim 1, wherein said fourth imaging unit and said fifth imaging unit are aimed to view only one side of said vehicle at a time.

11. The apparatus of claim 1, wherein said fourth imaging unit and fifth imaging unit extend beyond the front end and rear end of said vehicle, respectively, when open.

12. The apparatus of claim 1, wherein said fourth imaging unit and fifth imaging unit each include an extension member extending from said front end and rear end, respectively, said fourth imaging unit and said fifth extending unit being mounted adjacently to each of said extension member.

13. The apparatus of claim 1, wherein said fourth imaging unit and said fifth imaging unit are parallel to each other when both are opened.

14. The apparatus of claim 1, wherein centrally located of said plurality of display areas being larger than remaining of said plurality of display areas, said plurality of display areas at laterals ends of said display device being tapered.

* * * * *